United States Patent [19] [11] 4,191,116
Allison, Jr. et al. [45] Mar. 4, 1980

[54] INJECTION PLANTING TOOL

[75] Inventors: C. Jay Allison, Jr.; Kirk Willis, both of Chehalis, Wash.

[73] Assignee: Illinois Tool Works Inc., Chicago, Ill.

[21] Appl. No.: 930,790

[22] Filed: Aug. 3, 1978

[51] Int. Cl.² ............................................. A01C 11/02
[52] U.S. Cl. ......................................... 111/4; 111/92; 111/96; 175/19; 227/121
[58] Field of Search ........................... 111/1, 2, 4, 89, 92, 111/93, 94, 95, 96, 97, 98, 99; 227/5, 7, 121, 156; 173/13, 126; 175/19

[56] References Cited

U.S. PATENT DOCUMENTS

| 2,376,970 | 5/1945 | Keown | 111/4 X |
| 2,539,271 | 1/1951 | Rianda | 111/99 |
| 4,031,832 | 6/1977 | Edwards | 111/4 |
| 4,069,774 | 1/1978 | Lofgren et al. | 111/89 X |

FOREIGN PATENT DOCUMENTS

| 475974 | 8/1951 | Canada | 173/126 |
| 694803 | 9/1964 | Canada | 111/4 |

*Primary Examiner*—Robert E. Bagwill
*Assistant Examiner*—James R. Feyrer
*Attorney, Agent, or Firm*—Thomas W. Buchman; Edward L. Benno; Robert W. Beart

[57] ABSTRACT

An improvement in an injection planting tool of the type shown in U.S. Pat. No. 4,031,832. The improvement is a detent mechanism on the tool that is manually operable to grasp the plant container being injection planted by a person with the tool in the event a rock interfers with the attempted planting, so that the container can be retained in the tool for another attempted planting.

3 Claims, 7 Drawing Figures

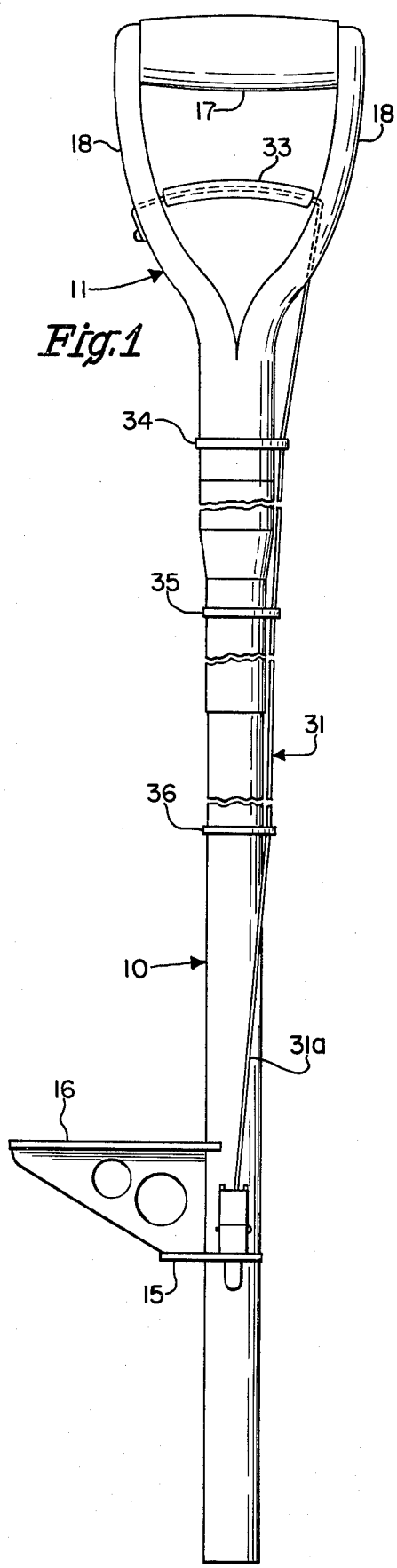
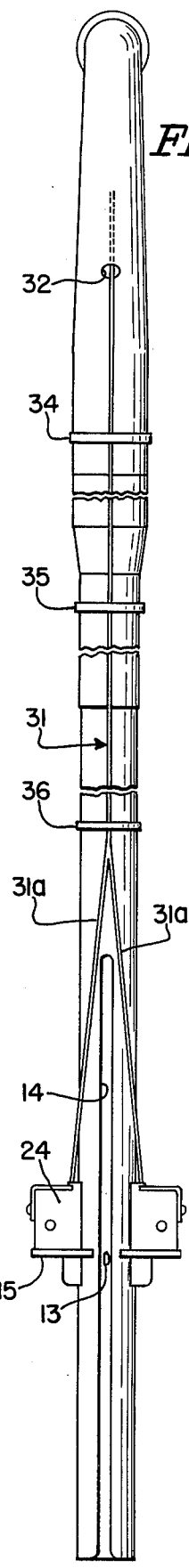
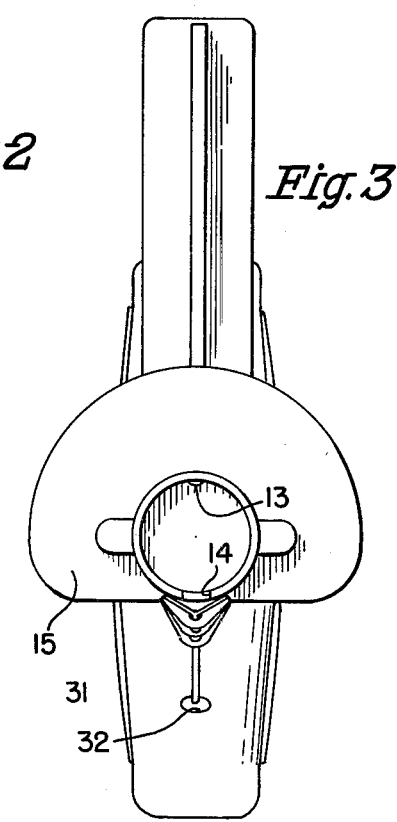
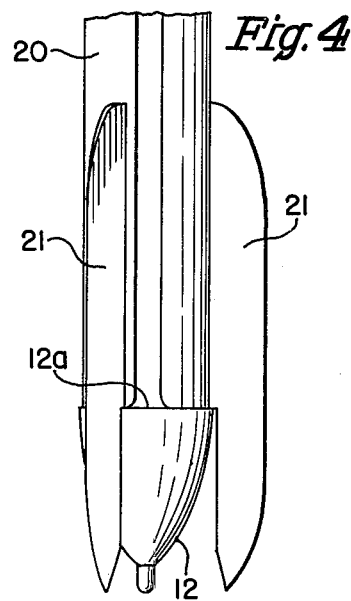
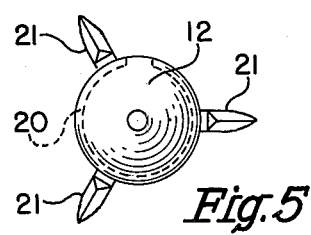
Fig.1
Fig.2
Fig.3
Fig.4
Fig.5

INJECTION PLANTING TOOL

BACKGROUND OF THE INVENTION

U.S. Pat. No. 4,031,832 shows an injection planting tool for injection planting skeletal plant containers or frames in which a plant is growing. For the injection planting procedure, the plant containers each comprise a base section having a depending bullet-shaped base section. The upper surface of each base section is provided with an annular shoulder and a plurality of ribs extending upwardly. The ribs are positioned radially within the shoulder and the upper ends of the ribs are connected to a ring which is disposed in a plane perpendicular to the longitudinal axis of the container.

As shown in the noted patent, the injection planting tool has a tubular lower section with a slot extending longitudinally of the tubular section. The internal diameter of the tubular section is substantially equal to or slightly larger than the outer diameter of the ring on the upper end of the containers. The container absent its sleeve is telescopically inserted into the lower end of the tubular section of the tool with the stem and top growth of the plant growing in the container extending outwardly of the tool through the slot in the tubular section. The ribs and ring are loosely frictionally held in the tubular section of the tool with the lower edge of the tubular section in vertical abutment upon the annular shoulder on the top of the base of the container.

As further described in the above noted patent, the planting tool is used by pushing the tubular section into the ground. When the tubular section has been pushed into the ground to a depth sufficient to place the plant container at its proper depth, the tool is withdrawn from the ground leaving the skeletal plant container growing therein planted in the ground. A disadvantage of the described tool is that if upon a particular insertion of the tubular section in the ground the base section of the plant container strikes a rock or other obstruction preventing insertion of the plant to the proper depth, pulling of the tool upwardly will not result in removal of the plant container and the plant container and the plant growing therein will be effectively lost.

SUMMARY OF THE INVENTION

As opposed to the planting tool described in U.S. Pat. No. 4,031,832, the planting tool of the subject invention provides a simple manually operated means by which a person using the tool in a planting procedure may positively grip the plant container in the tool and thereby withdraw the plant container with the tubular section of the tool from the ground if upon an attempted planting the container strikes a rock before being fully planted.

Other objectives and features of the invention will be apparent upon a perusal of the detailed description read in conjunction with the drawings.

BRIEF DESCRIPTION OF THE DRAWINGS

FIG. 1 is a side-elevational view of a planting tool constructed according to the invention;

FIG. 2 is a side-elevational view of the planting tool of FIG. 1 viewed 90° from the view of FIG. 1;

FIG. 3 is an enlarged bottom view of the tool of FIGS. 1 and 2;

FIG. 4 is a side-elevational view of the lower portion of a planting tool, such as the planting tool of FIGS. 1-3, with a modified construction and showing a plant container mounted therein;

FIG. 5 is a bottom view of the construction shown in FIG. 4;

DETAILED DESCRIPTION OF THE PREFERRED EMBODIMENTS

Figure 6:
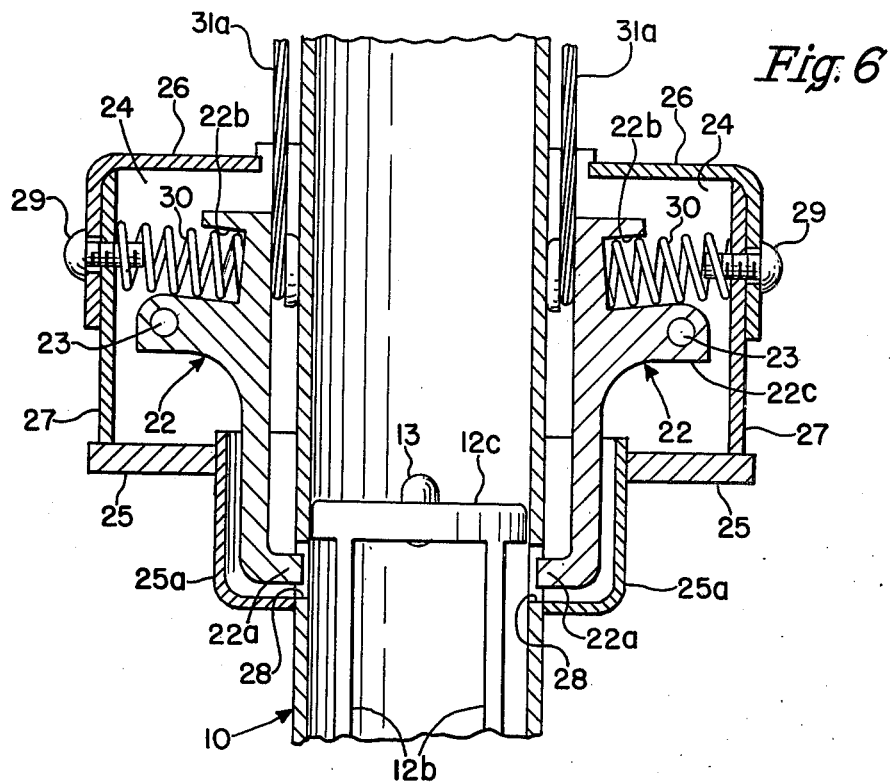
FIG. 6 is an enlarged cross-sectional view showing a portion of the tool shown in FIGS. 1-3 and showing the details of the means for positively holding the plant container in the tool.

As shown in FIGS. 1-3 the injection planting tool of the subject invention, which is an improvement over tools of the type shown in U.S. Pat. No. 4,031,832, comprises a lower tubular section 10 and an upper handle section 11. The tool is intended to injection plant skeletal plant containers of the type shown in U.S. Pat. No. 4,031,832 and having a bullet-shaped underside, and for details of such a container, reference is made to that patent. The lower portion of such a container can be seen in FIG. 4 at 12. That lower or base portion comprises a depending bullet-shaped section having an annular shoulder 12a on the upper end thereof. The container 12 further comprises a plurality of ribs extending upwardly from the upper end of the base section. The upper portion of such ribs are shown at 12b in FIGS. 6 and 7. The lower ends of the ribs 12b are connected to the base section of the container 12 radially within the shoulder 12a. At the upper end of the conainter 12 a ring 12c is provided as may be seen in FIGS. 6 and 7. The ring 12c has an outer diameter substantially equal to or slightly less than the internal diameter of the tubular section 10 of the planting tool.

Figure 7:
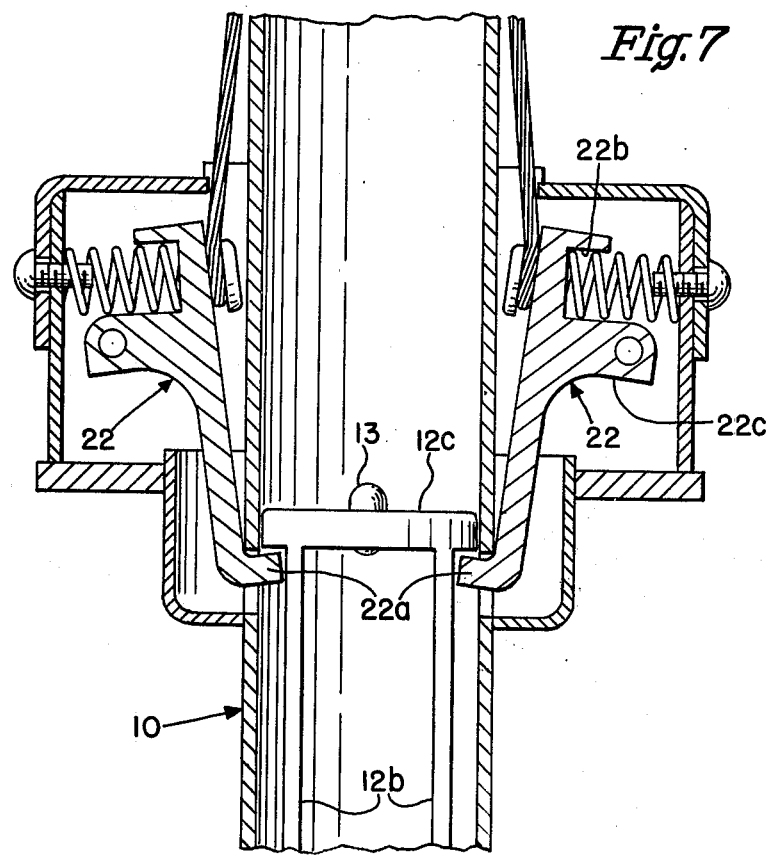
FIG. 7 is a view similar to FIG. 6 but showing the container holding means operated to positively hold the plant container in the tool.

The tubular section 10 of the planting tool has an outer diameter no greater than the outer diameter of the annular shoulder 12a on the container base. As noted in U.S. Pat. No. 4,031,832, it is preferred that the outer diameter of the tubular section 10 of the tool be slightly less than the maximum diameter of the annular shoulder 12a on the upper portion of the base of the container 12. With that arrangement, the container base effectively grips the earth into which the skeletal container has been injection planted with the tool and allows the planting tool to be withdrawn from the planted container and the ground. For convenient handling in the planting procedure without having the container fall from the tool, the described plant container 12 is frictionally held within the tubular section 10 of the tool with the lower edge of the tubular section 10 in vertical abutment upon the annular shoulder 12a by an internal projection 13 which may be seen in FIGS. 2, 3, 6 and 7 on the inner wall of the tubular section 10. The projection 13 is at a longitudinal position in the tubular section 10 such that it engages the ring 12c on the skeletal plant container when the plant container has been inserted into the tool as described. That position is shown in FIGS. 6 and 7.

As may be seen in U.S. Pat. No. 4,031,832, the skeletal container described above is used with a removable sleeve for growing a seedling that is to be later transplanted into the open ground. When the sleeve has been removed, the ribs 12b maintain the growing medium and root mass of the seedling together as a unit with the skeletal container or frame described for convenient handling and insertion of the skeletal container and plant grown therein into the planting tool. The skeletal container with the seedling grown therein is inserted in the tubular section of the tool with the stem and top growth of the seedling extending outwardly of the slot 14 in the tubular section 10.

Generally an injection planting tool as described further includes a stop plate 15 and a foot bar 16. In use of the tool, a person places his foot upon the foot bar 16 and pushes downwardly to project the lower portion of the tubular section 10 and any plant container carried therein into the ground until the proper planting depth is reached and indicated by the stop plate 15 engaging the surface of the ground.

The upper portion 11 of the planting tool comprises a D-shaped handle having a hand grip 17 secured between curved arms 18 formed as a bifurcated section of the upper portion 11 of the tool.

In the injection planting of containers, the earth wall surrounding the injection planted container on occasion will be excessively compacted. FIGS. 4 and 5 show a planting tool such as that of FIGS. 1-3 in which the tubular section 20 is provided with radially outwardly projecting knife-like members 21 which in the injection planting procedure will serve to cut or shear the earth wall about the planted container for easier egress of the plant roots radially outwardly into the adjacent soil and which also will prevent damage to the container base 12 if a hard obstruction is forcibly encountered.

The improved planting tool of the subject invention comprises a pair of detents 22 pivotally mounted on the outer surface of the tubular section 10 of the planting tool as may be seen in FIGS. 5 and 6. Each detent 22 comprises a hook section 22a at one end thereof and a spring receiving recess 22b at the other end thereof. Intermediate the ends of the detent 22 a projecting arm element 22c is provided to make the detent 22 a form of bell crank. The extending end of the arm 22c of the detent 22 is pivotally carried on a shaft 23. The ends of the shaft 23 are secured between opposed sidewalls 24 which are secured to the outer surface of the tubular section 10 and are aligned in directions extending longitudinally of the tubular section 10. The sidewalls 24 form two sides of box-like elements enclosing the detents 22 to reduce soil clogging of the detent mechanisms. The other walls of each of the box-like elements comprise a bottom wall 25, a top wall 26 and a radially outward sidewall 27.

The bottom wall 25 of each box-like element includes a depending cover portion 25a that encloses the lower end and the hook section 22a of the detent 22. Each cover portion 25a also encloses an aperture 28 through the tubular section 10 of the tool. The hook section 22a of each detent 22 is positioned to enter into one of the apertures 28 as may be seen in FIGS. 6 and 7. Each aperture 28 is positioned intermediately below the ring 12c of a container 12 positioned in the tool for planting as described above.

Between each spring receiving recess 22b of one of the detents 22 and the radially outward sidewall 27 a compressed coiled spring 30 is positioned. A screw 29 threaded through the wall 27 serves to maintain the spring 30 properly aligned and to also provide a convenient attachment for the top wall 26 to the box-like element. Each compressed coiled spring 30 biases one of the detents 22 so that the hook section 22a thereof is disposed radially outwardly of the interior of the tubular section 10 such as may be seen in FIG. 6.

The planting tool is further provided with a flexible cable 31 which may be seen in FIGS. 1-3. The lower portion of the flexible cable 31 is bifurcated into two cable elements 31a. The lower end of each cable element 31a extends through one of the top walls 26 to a point of securement on one of the detents 22 on the end of the detent 22 which has the spring receiving recess 22b and on the opposite side of the detent from that engaged by the coiled spring 30. The other end of the cable 31 extends through a hole 32 in one arm 18 of the D-shaped handle as may be seen in FIGS. 1-3. After passing through the hole 32, the cable 31 crosses the handle opening substantially parallel to and below the hand grip 17 to a point of securement on the other arm 18 of the D-shaped handle. In order that the cable 31 may be comfortably drawn upwardly, the portion of the cable spanning the opening in the D-shaped handle is provided with a flexible outer sleeve 33. The cable 31 is further held against the planting tool by a number of cable guides such as cable guides 34, 35 and 36.

With a skeletal container mounted in the tool as described above and with the ring element 12c thereof positioned as shown in FIGS. 6 and 7, a person using the tool may grasp the skeletal container and withdraw it from the ground with the tool by pulling the sleeve 33 on the cable 31 toward the hand grip 17 to draw the cable portions 31a upwardly. That operation will cause the detents 22 to pivot to a position such as shown in FIG. 7. In that operated condition of the detents 22, the hook sections 22a extend radially inwardly of the inner surface of the tubular section 10 below the ring 12c. Thus it may be seen that as the tool is pulled upwardly from the ground, the hook sections 22a will engage the underside of the ring 12c to prevent the skeletal container 12 from leaving the tubular section 10 by virtue of the radially outward edge of the shoulder 12a engaging the soil into which the container has been injected. As noted above, the described operation is conveniently used when a person attempts to plant a skeletal container in the ground and finds that prior to full depth insertion, the container 12 strikes a buried rock or other obstruction. Obviously if a person injection plants a container 12 to its full desired depth, the detents 22 are allowed to remain in the position of FIG. 6 and the tool is drawn from the ground to leave the container planted.

Having described the invention, it is to be understood that changes can be made in the described embodiments by a person skilled in the art within the spirit and scope of the claims.

We claim:

1. In a planting tool for inserting a seedling container in the ground in a planting operation wherein said seedling container comprises a bottom nose section having an annular shoulder formed on the upper end thereof and a plurality of ribs extending upwardly from said nose section radially within said shoulder with a ring connected across the upper ends of said ribs and a growing plant in said container having a stem and top growth extending upwardly therefrom, wherein said tool comprises an elongated member with one end thereof comprising a tubular section having an internal diameter substantially equal to the outer diameter of said ring and an outer diameter no greater than the outer diameter of said shoulder of said nose section and a length substantially greater than the length of said ribs, the improvement of manually operable means on said tool for selectively engaging said ring to hold said container against axial removal from said tubular section when said container is mounted with said ribs and ring in said tubular section and with the end of said tubular section against said shoulder wherein the other end of said elongated member is provided with handle means for manual use of said tool, said manually operable means on said tool comprising a detent pivotally mounted on said tubular section for pivotal movement from a first position where said detent is free of any engagement with said container to a second position where said detent engages said ring of said tubular section to hold said container against axial removal from said tubular section when said container is mounted with said ribs and ring in said tubular section and with the end of said tubular section against said shoulder, spring means biasing said detent to said first position, and a flexible cable extending from said detent to said handle means and operatively associated with said handle means to draw said cable to pivot said detent to said second position against the bias of said spring means.

2. In a planting tool as defined in claim 1, said detent comprising two duplicate detent elements pivotally mounted on diametrically opposed sides of said tubular section for pivotal movement between said first and second positions, said spring means comprising a pair of coiled springs each of which biases one of said detent elements to said first position, and said flexible cable being bifurcated in the lower portion thereof with each of the ends thereof connected to one of said detent elements.

3. In a planting tool for inserting a seedling container in the ground in planting operation wherein said seedling container comprises a bottom nose section having an annular shoulder formed on the upper end thereof and a plurality of ribs extending upwardly from said nose section radially within said shoulder with a ring connected across the upper ends of said ribs and a growing plant in said container having a stem and top growth extending upwardly therefrom, wherein said tool comprises an elongated member with a tubular section at one end thereof and a D-shaped handle at the other end thereof, wherein said tubular section has a longitudinal slot therein of a length substantially greater than the length of said container and a width substantially greater than the diameter of said stem of said plant and further has an internal projection, and wherein said container is mounted with said ribs and said ring in said tubular section with said stem of said plant extending through said slot and with the top growth of the plant outwardly of said tool and further with the end of said tubular section against said shoulder of said nose section and with said ring frictionally engaging said internal projection, the improvement of manually operable means on said tool for engaging said ring to selectively prevent axial removal of said container from said tool, said manually operable means comprising a pair of detent elements, a pair of openings formed through the wall of said tubular section at diametrically opposed locations on a diameter of said tubular section perpendicular to a diameter through said slot and at a position longitudinally of said tubular section immediately below said ring of said container in said tubular section, means pivotally mounting each of said detent elements on the outer surface of said tubular section with one end each detent element pivotally projectable through one of said openings and below and radially within the outer periphery of said ring of said container, a pair of springs, each of said springs carried on the outer surface of said tubular section and engaging the other end of one of said detent elements to spring bias said one end of said detent elements radially outwardly of the outer periphery of said ring, a flexible cable bifurcated at one end thereof, each portion of the bifurcated end of said cable connected to said other end of one of said detent elements and extending upwardly along the shank of said tool so that a pull on said cable longitudinally upwardly along the shank of said tool cause both of said detent elements to pivot and project said one ends thereof through said pair of openings and radially within the outer periphery of said ring of said container, the other end of said cable extending from said shank section of said tool through and across the central opening of said D-shaped handle and fastened to said handle, the portion of said cable extending across the central opening of said D-shaped handle being positioned for grasping and pulling thereon by a person grasping the handle for use thereof in projecting said tubular section into the ground.

* * * * *